United States Patent [19]

Singh

[11] 4,170,442

[45] Oct. 9, 1979

[54] TIRE PRESS UNLOADER

[75] Inventor: Anand P. Singh, Youngstown, Ohio

[73] Assignee: NRM Corporation, Akron, Ohio

[21] Appl. No.: 915,055

[22] Filed: Jun. 15, 1978

[51] Int. Cl.$^2$ .............................................. B29H 5/02
[52] U.S. Cl. ...................................................... 425/38
[58] Field of Search .................... 425/31, 32, 33, 38

[56] References Cited

U.S. PATENT DOCUMENTS

| 2,832,991 | 5/1958 | Soderquist | 425/38 |
| 2,832,992 | 5/1958 | Soderquist | 425/38 |
| 2,927,343 | 3/1960 | Soderquist | 425/32 |
| 3,012,279 | 12/1961 | Boysen | 425/33 |
| 3,141,191 | 7/1964 | Soderquist | 425/38 |
| 3,222,716 | 12/1965 | Harris | 425/31 |
| 3,336,630 | 8/1967 | Soderquist | 425/38 |
| 3,343,208 | 9/1967 | Pacciarini et al. | 425/38 |
| 3,530,533 | 9/1970 | Turk et al. | 425/32 |
| 3,685,929 | 8/1972 | Yoshida et al. | 425/38 |
| 4,013,186 | 3/1977 | Barton et al. | 425/38 |

FOREIGN PATENT DOCUMENTS 964363 7/1964 United Kingdom .................... 425/38

*Primary Examiner*—J. Howard Flint, Jr.

*Attorney, Agent, or Firm*—Maky, Renner, Otto & Boisselle

[57] ABSTRACT

A tire press unloader for a tire curing press of the upstanding bladder type includes a pivoting tire platform mounted for vertical movement on a horizontally movable unloader frame. The platform includes a pivot control member to keep the same from pivoting during initial upward movement and then require the same to pivot during the final vertical movement. The control member also requires the platform to return to its horizontal position as it starts downwardly. Obstructions in the path of the control member require such pivotal movement. The tire platform is mounted on a pivoting horizontal shaft disposed in vertical slots in the unloader frame and the pivot control member is secured to the shaft for common pivotal movement. When the press is opened and the cured tire has been elevated by the bladder mechanism, the tire platform is positioned beneath the cured tire to support the tire as the bladder is stripped therefrom. The tire platform is then elevated thus vertically to lift the tire over the top of the upstanding bladder to cause the tire to slide down by gravity to a retractable two element centering tire stop. The tire stop is retracted and the tire rolls into a PCI or out of the press.

34 Claims, 12 Drawing Figures

TIRE PRESS UNLOADER

BACKGROUND OF THE INVENTION

This invention relates generally as indicated to a tire press unloader and more particularly to an unloader for a press of the upstanding bladder type.

Various types of unloading devices for tire presses have been in use or known for a number of years. However, in curing presses which employ an upstanding bladder mechanism, removal of the tire is particularly difficult because of the presence of the bladder mechanism. Moreover, removal of the tire is further complicated by the post cure inflation of the tire after curing in that the tire must be properly presented to the post cure inflator (PCI) to insure automatic operation. In addition, the cured tire should be removed vertically from the bladder mechanism to minimize chances of a bead being caught by the top of the shaping bladder and being punched or kinked.

One type of curing press unloader which has solved the above-noted problems is illustrated in Barton et al U.S. Pat. No. 4,013,186. Although such unloader can properly perform the desired removal of the tire from the curing press, it employs a large number of moving parts and is somewhat complicated in operation. It would be desirable to provide an unloader with fewer moving parts and less complicated operation which can properly remove cured tires from presses.

Other types of unloaders employ complex cam slots for actuation of a tire platform or the like for removal of a tire from the curing press; however, such cam slots are difficult and expensive to machine and are subject to substantial wear requiring early replacement of the component which contains the cam slots. Moreover, adjustment of the platform lift height in such unloaders for different sizes of tire curing presses is difficult and oftentimes requires a new set of cam slots. One such type of unloader mechanism is illustrated in Yoshida et al U.S. Pat. No. 3,685,929 which employs a plurality of cooperating cam followers and complex guide grooves therefor to move a tire platform through a predetermined path to remove a tire from a tire curing press.

Other unloaders are shown in U.S. Pat. Nos. 2,832,991, 3,075,237; 3,222,716; 3,336,630 and 3,477,100.

SUMMARY OF THE INVENTION

It is accordingly a principal object of the present invention to provide a tire press unloader having relatively few moving parts and being relatively uncomplicated in operation, and yet providing for removal and positive control of a cured tire from the press to a PCI.

Another principal object of the invention is the provision of a tire press unloader of a simple, inexpensive and easy-to-maintain design.

Still another principal object is the provision of a tire press unloader which rigidly supports the tire while the bladder is stripped from the same and vertically elevates the tire to clear the same from the bladder mechanism reducing the chances of kinked beads.

Yet another important object is the provision of a tire press unloader of low maintenance requirements.

Still yet another important object is the provision of an unloader which is easily adjusted for different sizes of presses.

A further important object is the provision of an unloader of relatively low profile which can readily interfit with a dual cavity curing press.

Yet a further important object is the provision of an unloader as set forth above wherein these objectives may be accomplished by a tire support platform mounted for vertical and pivotal movement on a horizontally movable unloader frame, and a pivot control member connected to the platform for common pivotal movement to keep the platform from pivoting during the initial upward movement thereof and to require the platform to pivot during the final vertical upward movement thereof and reversely pivot during the initial downward movement thereof.

Still a further object of the invention is the provision of such an unloader wherein the tire platform is mounted on a pivoting support shaft disposed in vertical slots in the unloader frame for vertical movement therein and the pivot control member is connected to the shaft for common pivotal movement.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In said annexed drawings:

FIGS. 8-12 are schematic views illustrating the operation of the unloader, and more particularly:

DESCRIPTION OF THE PREFERRED EMBODIMENT

Figure 1:
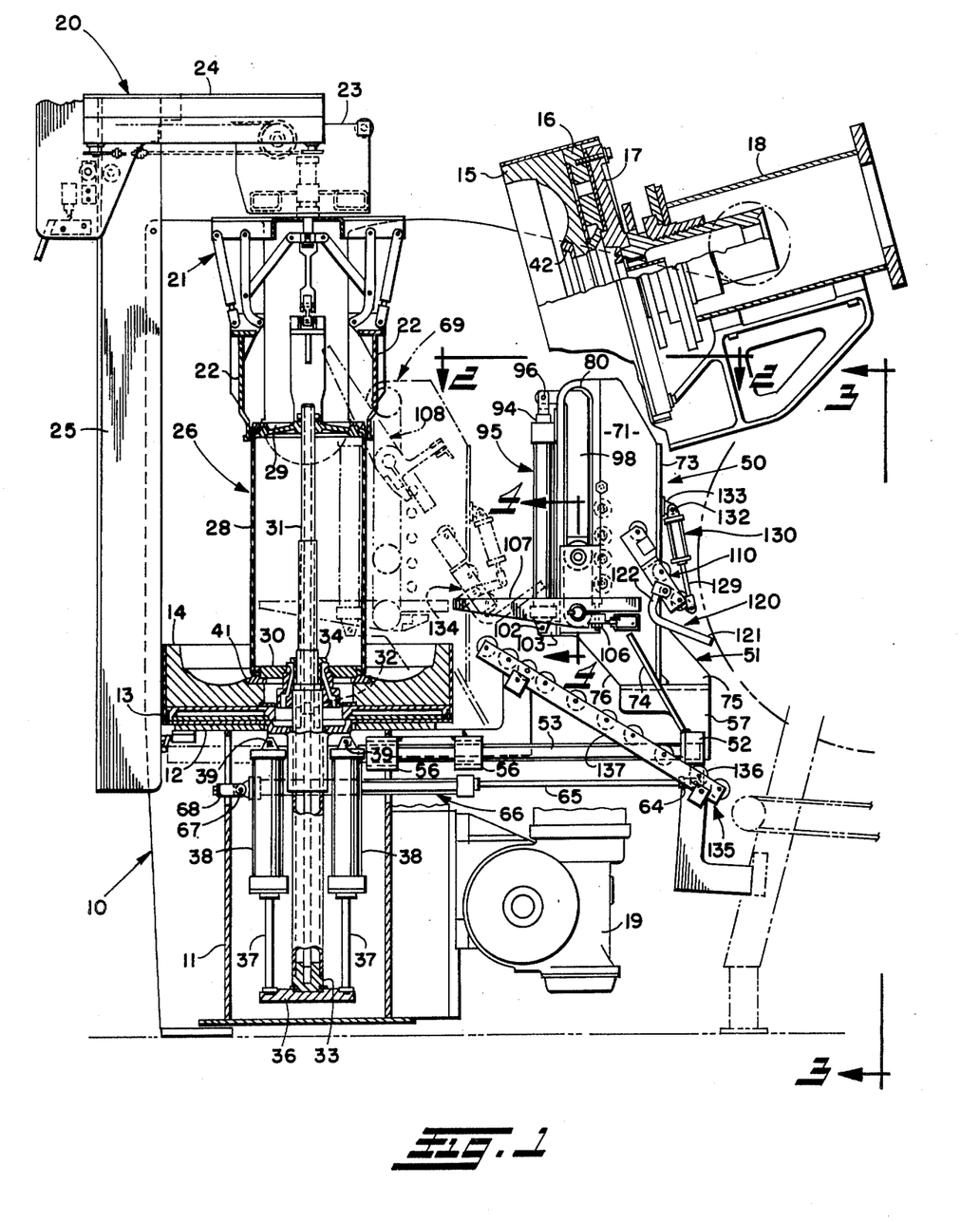
FIG. 1 is a vertical section of a dual cavity curing press in its open position and partially broken away for clarity of illustration, illustrating the unloader in accordance with the present invention and showing the unloader in full lines retracted fully, and in phantom lines centered in the curing press in one position prior to elevation of the tire platform and in another position with the tire platform fully elevated and fully tilted.

Referring now in greater detail to the drawings, and initially to FIG. 1, it will be seen that the unloader of the present invention can be utilized with a tire press 10 of the type shown. The press comprises a stationary, fabricated base frame 11 having a main suport plate 12 on which is supported a platen 13 and a bottom mold section 14. The bottom mold section is stationary with respect to a top mold section 15 and its platen 16 which is pendantly adjustably supported through bolster 17 from press head 18. The press is shown in its fully opened position but may be closed to form the tire curing cavities between the bottom and top mold sections 14 and 15. Opening movement of the press is obtained by first moving the press head 18 from its closed position vertically upwardly maintaining its parallelism with the bottom mold section 14, and then to the tilted full open position shown in FIG. 1. The press may be closed by following a path directly opposite to that for opening the press. The press head is moved through drive 19, hereinafter described, which rotates bull gears at each side of the press which are connected to the press head by links, the connection including rollers guided by the side plates shown in outline in FIG. 1, all in conventional fashion.

The front of the press as seen at the left in FIG. 1, is provided with a green tire loader shown generally at 20 which includes a chuck assembly 21 including a plurality of radially expandable and contractable shoes 22 to engage and release the inner upper bead of a green tire. The chuck assembly 21 is mounted for fore and aft movement on a frame 23 in turn supported on an elevator frame 24 which is in turn mounted for vertical movement on elevator rails 25 which may be mounted on the press side plates. The loader may pick a green tire up from the floor or pick-up position in front of the press and deposit the same in the bottom mold section 14 when the press is open by a sequence of movements of the unloader. For a more detailed description of a suitable loader, reference may be had to the loader depicted in U.S. Pat. No. 3,924,983 issued Dec. 9, 1975.

The press 10 has an upstanding bladder mechanism generally indicated by reference numeral 26 which is, of course, upstanding only when the press is opened as shown in FIG. 1. The bladder mechanism includes a cylindrical shaping bladder 28 having upper and lower beads clamped by upper and lower bead clamping assemblies 29 and 30, respectively. Post 31 supports the upper bladder bead ring assembly 29 and the post is in turn supported on a piston 32 within post cylinder 33. The upper end of the post cylinder 33 supports the lower bead clamping assembly which includes spray ring 34 for the circulation of curing medium within the bladder during shaping and curing. The lower end of the post cylinder 33 is supported on spider 36 connected to the rods 37 of the bead lift cylinders 38, the blind ends of which are connected at 39 to the base of the press. Accordingly, the bead lift cylinders 38, when retracted, elevate the entire center mechanism. The bead shaping ring 41 which underlies the bottom bead of the tire is a part of the bottom bladder bead clamping assembly 30 and when the center mechanism is elevated, the cured tire will move therewith. In contrast, the upper bead ring 42 is mounted on the upper mold section and moves therewith when the press opens as seen in FIG. 1. The opening of the press, of course, strips the tire from the top mold section. When the center mechanism is elevated, the cured tire will be stripped from the bottom mold section. Then, in such position, the tire is now ready for stripping of the bladder and unloading.

It wil be appreciated that most presses manufactured today are known as dual cavity presses which are equipped with two side-by-side molds, the positioning of which will become apparent from the following description of the unloader 50.

Figure 2:
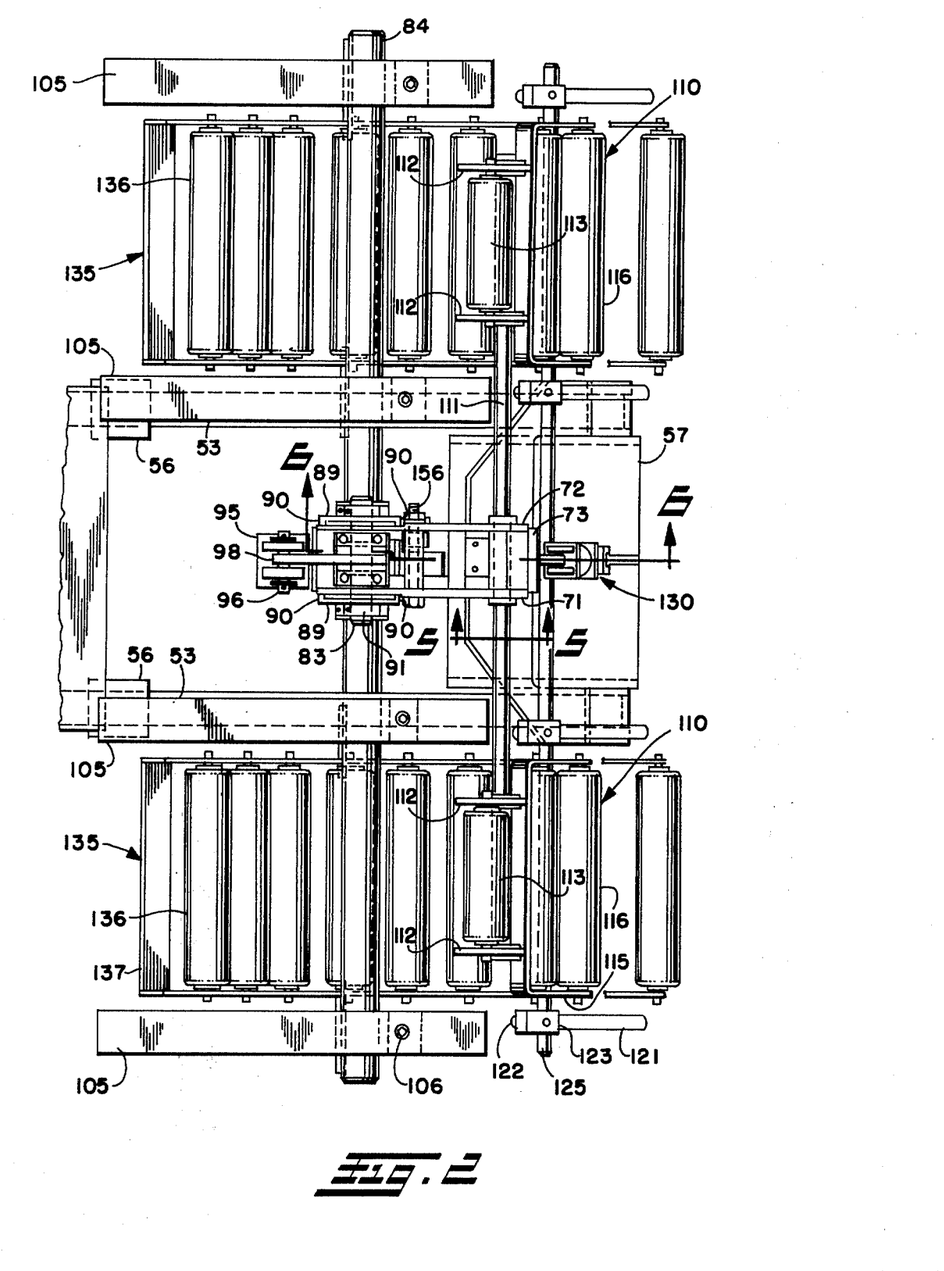
FIG. 2 is a top plan view of the tire unloader fully retracted as seen from the line 2—2 of FIG. 1.
Figure 3:
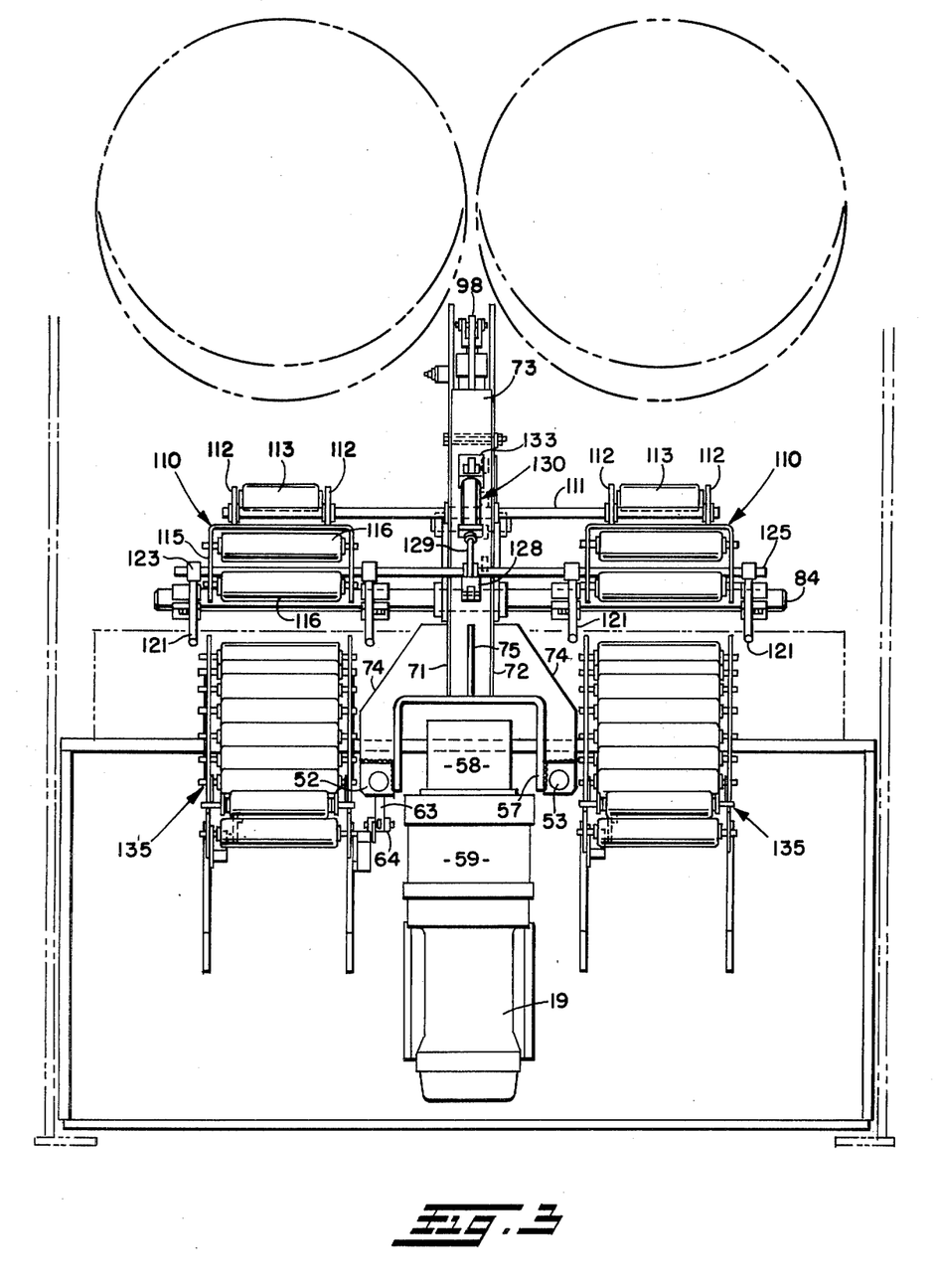
FIG. 3 is a rear end elevation of the tire unloader as seen from the line 3—3 of FIG. 1.

Referring now to FIGS. 1, 2 and 3, it will be seen that the unloader 50 includes a fabricated upstanding unloader frame 51 which is secured at 52 to horizontal guide rods 53 which are slidingly received in bushings 56, the housings of which may be welded to the bottom of main horizontal support plate 12 or otherwise fixedly fastened relative to the press. There are two such rods which are in parallel relationship and such rods project rearwardly of the press. Each rod supports one downwardly extending leg of an inverted U-shape saddle 57 of the unloader frame. The saddle is inverted U-shape in construction so that it will clear the brake housing 58 on top of press drive motor 59 for drive 19.

It will of course be appreciated that alternative ways of supporting the unloader frame may be provided, for example, bushings attached to the saddle legs may move over guide shafts fixedly attached to the base frame, guide shafts attached to the legs of the saddle may move between spaced-apart grooved rollers attached to the base frame, or spaced-apart grooved rollers attached to the legs of the saddle may move over guide shafts attached to the base frame. The unloader frame may also be mounted for relative horizontal movement to the press in other ways.

Pivotally connected to a bracket 63 secured to one of the connections 52 of the U-shape saddle is rod clevis 64 which is secured to rod 65 of piston-cylinder assembly 66, the cylinder of which is pivoted at 67 to bracket 68 secured to the base frame 11 of the press. Retraction of the piston-cylinder assembly 66 will move the unloader frame 51 from the solid line position seen in FIG. 1 to the phantom line position 69 and extension of the piston-cylinder assembly 66 will retract the unloader frame to the solid line position.

Secured to the top and projecting forwardly of the saddle 57 are two upstanding side plates 71 and 72 which are connected together in spaced, parallel relationship by back plate 73. The side plates and back plate may be provided, respectively, with lateral gussets 74 and back gusset 75 for rigidity. The side plates, which preferably are identical in form, are each preferably substantially in the shape of a parallelogram having vertical and inclined sides such that the plates project forwardly and upwardly from the saddle. The lower inclined sides 76 of the plates provide clearance with the base frame interconnecting the side-by-side molds of the curing press.

Figures 4, 5, 6, 7:
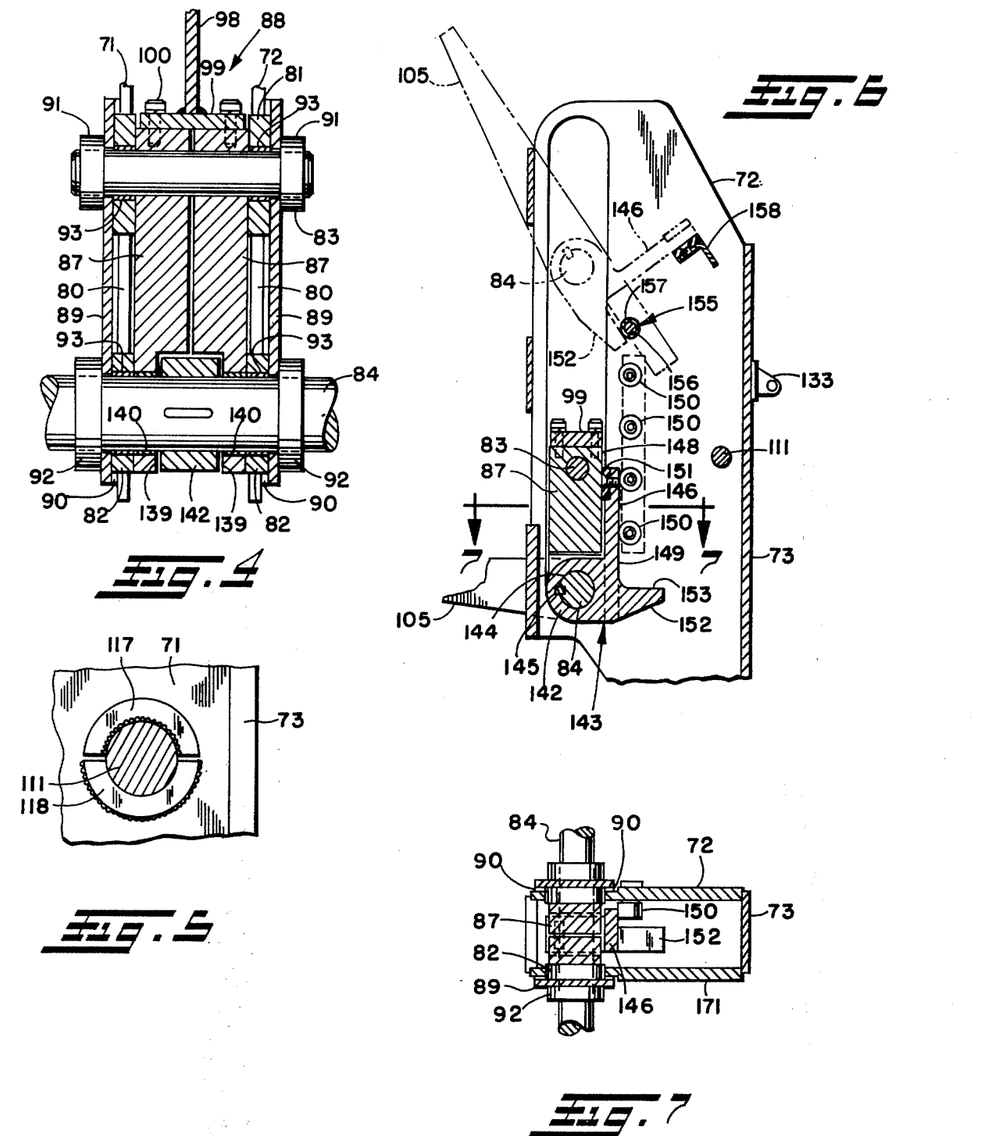
FIG. 4 is an enlarged, transverse, vertical section through the lift frame of the unloader as seen from the line 4—4 of FIG. 1.
FIG. 5 is an enlarged, fragmentary, vertical section showing the roller platform support shaft and anti-rotation collars secured to the shaft and unloader frame as seen from the line 5—5 of FIG. 2.
FIG. 6 is a partial vertical section of the unloader taken from the line 6—6 of FIG. 2 showing the lift frame, pivot control member and guides therefor in full lines vertically retracted and the tire support arm and pivot control member in phantom lines fully tilted as occurs when the lift frame is fully vertically elevated.
FIG. 7 is a partial horizontal section through the lift frame of the unloader as seen from the line 7—7 of FIG. 6.

Referring still to FIGS. 1, 2 and 3, and additionally to FIG. 4, the side plates of the unloader frame at their forward ends are each provided with a vertically extending guide slot 80 which each guide vertically aligned rollers 81 and 82. The rollers 81 and 82 are rotatably supported on roller shaft 83 and pivot shaft 84, respectively, which extend through bores in shaft support plates 87 of the vertical lift frame 88. The shaft support plates, when positioned between the support plates, are of a combined thickness slightly less than the spacing between the two plates 71 and 72. The rollers 81 and 82 are mounted on the shafts at the outer sides of the respective support plates 87 and are retained in place by side slide plates 89 which span the slots 80 and have inwardly extending short vertical legs 90 which slidingly engage the outer surfaces of the plates 71 and 72 adjacent the guide slots. The slide plates have bores through which the shafts extend, and collars 91 and 92 are secured to the roller and pivot shafts adjacent the slide plates, respectively, and maintain the vertical lift frame in the described assembled relationship. Suitable bushings 93 may be provided to reduce wear and facilitate rotation of the rollers.

The rod 94 of a vertical lift piston cylinder assembly 95 is pivotally connected by clevis 96 to the end of the short horizontal leg of an L-shaped bracket 98. At the end of the long vertical leg of the bracket is secured a horizontal mounting flange 99 which is connected to the top of the shaft support plates 87 by suitable fasteners 100. The blind end of the piston-cylinder assembly is pivotally connected at 102 to bracket 103 horizontally projecting from plates 71 and 72. Extension of the piston-cylinder assembly 95 will move the vertical lift frame upwardly, and retraction will move the vertical lift frame downwardly to the full line position seen in FIG. 1.

As best seen in FIGS. 2 and 4, the pivot shaft 84 projects horizontally laterally from both sides of the vertical lift frame and extends substantially across the width of the dual cavities of the curing press. Keyed or otherwise connected to the shaft for pivotal movement therewith are pairs of spaced-apart tire support and lift arms 105. The spacing between the tire support arms may be adjusted to accommodate tires having different bead diameters by moving the same together or apart along the shaft and resecuring the same to the shaft. For this purpose, the arms rearwardly of the shaft are split longitudinally and clamping fasteners through the split may be provided as seen at 106. The lift arms extend substantially forwardly from the pivot shaft and each has a substantially flat upper support or platform surface 107 for support of a tire thereon, and thus together define two tire lift and support platforms on each side of the frame 51. In the vertically retracted position shown in solid lines in FIG. 1, the plateform surfaces 107 of the lift arms extend horizontally. During operation of the unloader, however, the lift arms will pivot to the inclined position shown in phantom lines at 108 in the manner described hereinafter to cause the tires supported by each pair of lift arms to slide downwardly and rearwardly onto respective inclined tire receiving roller platforms 110.

Each inclined tire receiving platform 110 is mounted rearwardly of each respective pair of lift arms at each end of a laterally and horizontally projecting roller platform support shaft 111 which extends essentially parallel to the pivot shaft and which extends through bores in the side plates 71 and 72 to which it is secured. Each such platform includes a pair of spaced-apart roller support plates 112 connected to the support shaft between which is journalled roller 113. Rearwardly of the support plates and connecting the same is secured a U-shaped bracket 115 having two additional tire supporting rollers 116 mounted therebetween. The axes of the three rollers are in a common inclined plane which extends at approximately the same angle of inclination as the tire support arms when the latter are fully tilted, and when fully tilted the platform surface of the lift arms and the supporting surfaces of the rollers are substantially in line and adjacent each other. As seen in FIG. 5, the support shaft is journalled between the plates and prevented from significant rotation by a pair of juxtaposed semi-circular collars 117 and 118. The lower collar 118 is welded to the plates while the upper collar 117 is welded to the shaft and the flat diametrical side faces thereof are juxtaposed and substantially abutting each other to limit rotation of the support shaft. Such construction provides a slight yielding of the platform 110 to assist in tire arrest.

A tire centering stop 120 is provided rearwardly of each roller platform 110 which when in its extended position projects above the tire support surfaces of the rollers and when in its retracted position, is withdrawn below the plane of the support surfaces of the rollers to permit the tire to roll off the inclined roller platform. Each tire stop includes rearwardly of each roller platform a laterally spaced pair of L-shape elements or arms 121 which are connected at their shorter legs 122 to brackets 123 which are keyed to a shaft 125 which extends through bores provided in the legs of each U-shape bracket 115. The spacing between the stop arms of each pair can be adjusted for different tire sizes in similar fashion to the pivot arms. Connected to the shaft intermediate the roller platforms is a crank 128. The rod 129 of piston cylinder assembly 130 is connected to the arm of the crank and the blind end of the same is pivoted at 132 to fixed bracket 133 mounted on the back plate 73. Accordingly, retraction of the piston cylinder assembly will cause the shaft 125 and thus the stop arms to pivot in a counterclockwise direction as viewed in FIG. 1 elevating the tire stop arms to a stop position illustrated in phantom lines at 134 which prevents the tire from rolling off the roller platforms. In addition, the stop arms cooperate to center the tire therebetween prior to removal of the same. Extension of the piston cylinder assembly as shown in FIG. 1 lowers the tire stop arms to a position beneath the plane of the support surfaces of the rollers so that the centered tire will roll off onto the inclined fixed conveyor 135 and finally into the PCI. Each conveyor 135 includes a plurality of rollers 136 which are journaled between conveyor side frames 137 which in turn are mounted between the base frame and PCI by suitable brackets.

Referring now additionally to FIGS. 6 and 7, it will be seen that the shaft support plates 87 at the lift frame 88 each have an inner relief 139 adjacent the bores 140 at their lower ends which together accommodate boss portion 142 of pivot control or tripper member 143. The boss portion has a bore 144 through which the pivot shaft extends and is connected to the shaft for common pivotal movement by key 145. The boss portion projects forwardly from the lower end of pivot-prevent arm 146 of the pivot control member. The pivot-prevent arm is plate-like and extends in a direction normal to the platform surfaces of the lift arms which also are keyed to the pivot shaft as described above. When the tire lift arms are horizontal, and down, the upper end of the pivot-prevent arm abuts against the rearward vertical surfaces 148 of the support plates 87 and prevents counterclockwise pivotal movement of the pivot control member, which in turn prevents counterclockwise pivotal movement of the lift arms from the horizontal position as seen in FIG. 6. Moreover, when in such position, the pivot-prevent arm at its rearward surface 149 also will engage and ride along during initial vertical movement thereof a plurality of vertically aligned and spaced guide rollers 150 mounted on plate 72 to project inwardly therefrom. The guide rollers are positioned such that when the pivot-prevent arm in coextensive therewith, clockwise pivoting of the pivot control member is prevented as seen in FIG. 6. Preferably, a suitable bumper 151 may be secured to the top of the pivot-prevent arm for abutment with the shaft support plates. Such bumper is of a thickness such that it will be in compression against the support plates when the pivot-prevent arm is coextensive with the guide rollers to take up any play therebetween thus to provide a relatively rigid tire lift and support platform.

The pivot control member 143 further has a trip or pivot arm 152 which projects rearwardly from the lower end of the pivot-prevent arm 146 opposite the boss portion 142. The pivot arm has an upper camming surface 153 substantially normal to the pivot-prevent arm and thus substantially parallel to the platform surfaces of the lift arms. Preferably, the plane of such camming surface extends through the axis of the pivot shaft 84. The pivot control member thus can be seen to be of L-shape configuration and connected at the end of its short arm or base to the pivot shaft.

The trip arm 153 is laterally offset as seen in FIG. 7 so that it will clear the guide rollers during elevation of the lift frame. As the lift frame ascends to its highest position, trip arm 152 will engage an obstruction 155 which includes a trip bar 156 secured at its ends by suitable fasteners between the plates 71 and 72. This requires the pivot control member and pivot shaft and thus the lift arms to pivot upwardly and rearwardly in a clockwise direction to the inclined position shown in phantom lines in FIGS. 1 and 6 at an angle of about 55° to horizontal to cause a tire supported on the lift arms to slide by gravity for removal of the same in the manner described below. Of course, when the pivot arm engages the obstruction, the pivot control member will be free to pivot clockwise as the pivot-prevent arm will no longer ride along and rest against the guide rollers. However, as the lift frame is lowered, the pivot-prevent arm will first engage the uppermost guide roller which requires the control member and thus the tire lift arms reversely to pivot in a counterclockwise direction as seen in FIGS. 1 and 6 to return the latter to a horizontal position.

To reduce wear on the bar 156 and camming surface 153, a freely rotatable bushing 157 may be provided on the bar 156 intermediate the plates 71 and 72. In addition, when fully tilted, the pivot arm may come to rest against bumper 158 secured between side plates 71 and 72.

It will be appreciated that the unloader may be readily adapted to provide for adjustment of the vertical height at which the lift arms 105 are required to pivot. For example, a plurality of vertically and transversely aligned bores may be provided in the plates 71 and 72 whereby the obstruction 155 may be vertically relocated thereby to adjust the vertical height at which the lift arms 105 are required to pivot. Also, provision may be made for corresponding adjustment of the height of the bumper 158.

Figure 8:
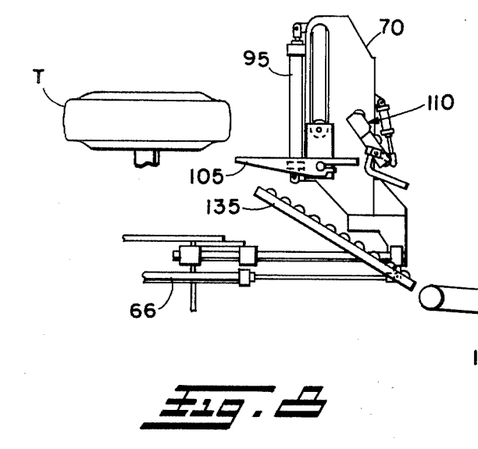
FIG. 8 shows the unloader in its fully retracted position relative to the tire curing press.

Referring now to FIGS. 8 through 12, the operation of the unloader can be seen. In FIG. 8, the curing press has already been opened and the tire T stripped from the top mold section. The bead lift cylinders have also been retracted elevating the center mechanism and the tire to the position seen in FIG. 8, stripping the tire T from the bottom mold section. The unloader is in its full retracted position but may now commence its operation.

The first operation is the retraction of the unloader frame piston cylinder assembly 66 which moves the unloader frame 70 horizontally to the left from the position seen in FIG. 8. The tire lift arms 105 are thereby positioned beneath the tire and will firmly support the same as the bladder 28 is stripped from the cured tire. To strip the bladder 28 from the tire T, the post is elevated and the lower bladder bead clamping assembly 30 is lowered simultaneously causing the bladder to assume the upstanding position seen in FIG. 9. This may create a significant downward force on the tire which is supported on the tire lift arms therebeneath, the latter being rigidly maintained to minimize spring-back of the tire.

Figure 9:
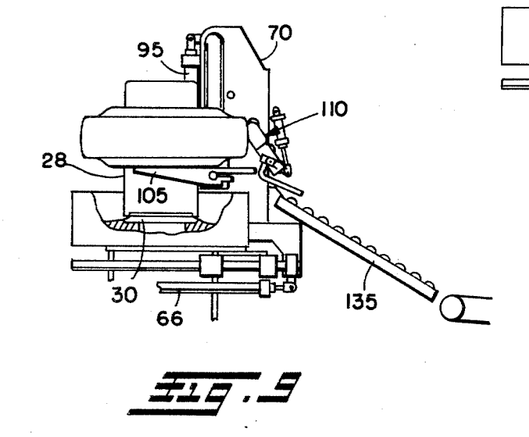
FIG. 9 shows the unloader positioned in the press with the tire platform supporting the cured tire which has been stripped of the shaping bladder.

After the bladder has been completely stripped from the tire, the lift cylinder 95 is extended causing the lift arms to elevate the tire to clear the same from the bladder mechanism. During vertical travel of the tire, the lift arms and thus the tire are prevented from tilting rearwardly by the pivot-prevent arm of the tripper member 143 riding on the guide rollers 150. Forward tilting of the lift arms is prevented by the pivot-prevent arm engaging the shaft support plates 87.

Figure 10:
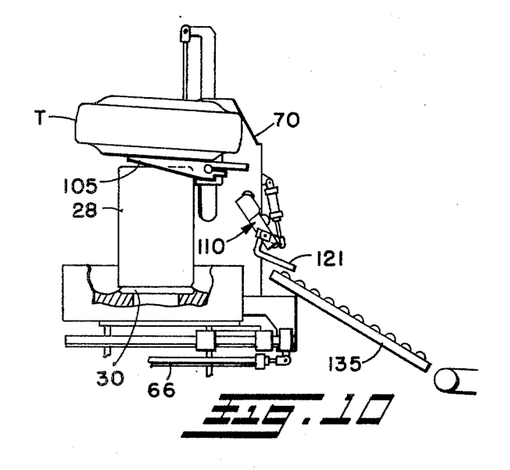
FIG. 10 shows the platform and tire partially elevated and slightly tilted.
Figure 11:
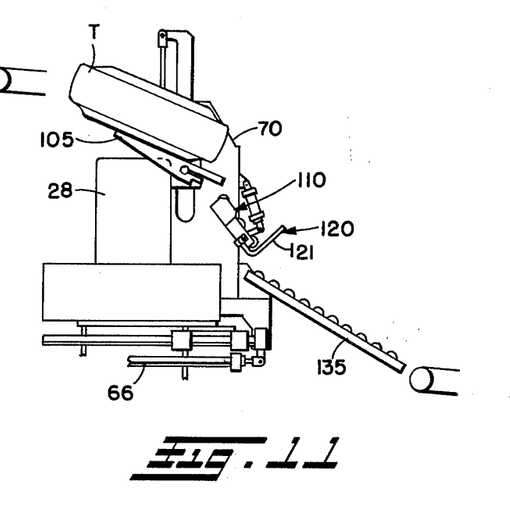
FIG. 11 shows the platform further partially elevated and tilted with tire stop extended.
Figure 12:
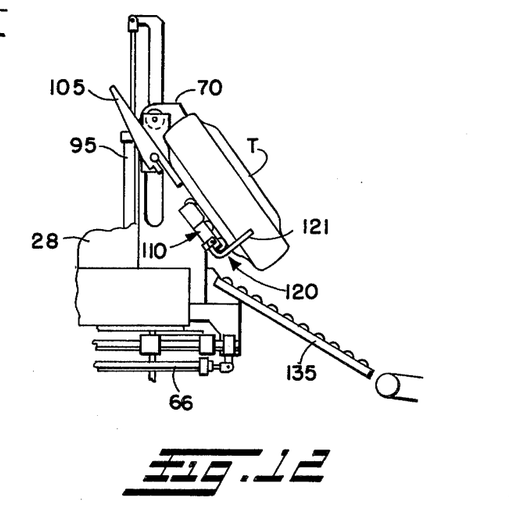
FIG. 12 shows the platform and tire fully elevated and tilted for removal of the tire, the tire having slid downwardly and now resting on the tire stop.

When the tire has substantially cleared the bladder, further vertical movement of the lift arms will now cause the same to tilt back as shown in FIGS. 10 and 11 to the fully tilted position shown in FIG. 12. The elevation and tilting of the lift arms as described causes the tire to clear the upstanding post. As the tire reaches the full tilt position shown in FIG. 12, the tire will slide downwardly onto the roller platform 110 against the stop arms 121 which have already been moved to their extended position by retraction of piston cylinder assembly 130. The stop arms 121 may then be retracted by extension of the piston cylinder assembly 130 and the tire will roll onto conveyor 135 and into the PCI or out of the press. The conveyor 135 may include a limit switch signaling that the tire has cleared the press.

The lift cylinder 95 is retracted to lower the lift arms to their fully retracted position and as the lift arms start downwardly, the control member requires the same to return to their horizontal position, thus to present the unloader in position ready for subsequent unloading as seen in FIG. 8. The piston-cylinder assembly 66 also is extended moving the unloader frame horizontally to the right to its fully retracted position, clearing the press for loading and closing.

It will now be appreciated that there is provided a tire unloader with relatively few moving parts and of simplified operation.

The embodiments of the invention in which an exclusive property or privilege is claimed are defined as follows:

1. An unloader for a tire curing press comprising a horizontally movable unloader frame, pivoting tire elevating and supporting platform means mounted on said unloader frame for vertical movement relative thereto, means thus to move said platform means, and means to keep said platform from pivoting during the initial upward movement thereof and to require said platform to pivot during the final vertical upward movement thereof, said means to require said platform to pivot comprising an obstruction on said unloader frame.

2. An unloader as set forth in claim 1 comprising pivot arm means for engaging said obstruction during such final vertical upward movement, said pivot arm means being connected to said platform means for common pivotal movement therewith.

3. An unloader as set forth in claim 2 wherein said platform means extends forwardly of its pivot axis and said pivot arm means extends rearwardly of such axis to engage said obstruction rearwardly of such pivot axis.

4. An unloader as set forth in claim 1 wherein said means to keep said platform means from pivoting comprises vertical guide means on said unloader frame.

5. An unloader as set forth in claim 4 wherein said guide means requires said platform reversely to pivot during initial downward movement thereof.

6. An unloader as set forth in claim 5 comprising guide arm means connected for common pivotal movement to said platform means for engaging and riding along said vertical guide means to prevent pivotal movement of said platform means in one direction during such initial vertical movement thereof.

7. An unloader as set forth in claim 6 wherein said guide arm means extends substantially normal to said platform means.

8. An unloader as set forth in claim 7 wherein said platform means is pivotally mounted on a lift frame and said lift frame is mounted for vertical movement on said unloader frame.

9. An unloader as set forth in claim 8 wherein said guide arm means engages said lift frame to prevent pivotal movement of said platform means in the direction opposite said one direction during such initial vertical movement thereof.

10. An unloader as set forth in claim 6 wherein said guide means comprises a plurality of vertically spaced rollers.

11. An unloader as set forth in claim 1 wherein said unloader frame comprises a pair of spaced-apart vertical plates and said obstruction comprises a bar secured to at least one of said plates and extending transversely between said plates.

12. An unloader as set forth in claim 11 wherein said bar is secured to both of said plates.

13. A cured tire unloader for a tire press of the upstanding bladder type comprising unloader frame means having vertical slot means therein, means to move said unloader frame means horizontally, lift frame means including roller means disposed in said slot means for vertical movement therein, means to move said lift frame means vertically, tire support means mounted for pivotal movement on said lift frame means, and pivot control means to maintain said support means horizontally during elevation of the same to lift a tire and then to tilt said support means rearwardly when thus elevated to clear the tire from the upstanding bladder and to cause the tire to slide by gravity to the rear of said support means.

14. An unloader as set forth in claim 13 wherein said pivot control means comprises an L-shape member connected to said support means for common pivotal movement therewith.

15. An unloader as set forth in claim 14 comprising an obstruction on said unloader frame means and one of the arms of said L-shape member is adapted to engage said obstruction to require the same and thus said support means to tilt upwardly and rearwardly.

16. An unloader as set forth in claim 15 wherein the other arm of said L-shape member is adapted to engage said lift frame means rearwardly thereof to prevent said support means from tilting downwardly and forwardly.

17. An unloader as set forth in claim 16 further comprising vertical guide means and said other arm is adapted to engage and ride along said vertical guide means to prevent said support means from tilting upwardly and rearwardly until said one arm engages said obstruction.

18. An unloader as set forth in claim 17 wherein one of the arms of said L-shape member extends substantially parallel to said support means and the other extends substantially normal to said support means.

19. An unloader as set forth in claim 17 wherein said arm has a thickness and said vertical guide means is spaced apart from said vertical lift means about such thickness when coextensive.

20. An unloader as set forth in claim 19 comprising resilient bumper means on said other arm to engage said lift frame means.

21. An unloader as set forth in claim 20 wherein said bumper has a thickness and the combined uncompressed thicknesses of said bumper and other arm is greater than the spacing between said vertical guide means and lift frame means when coextensive.

22. An unloader as set forth in claim 13 comprising a tire receiving roller platform on said unloader frame means and rearwardly of said support means, said roller platform being inclined and in line with said support means when the latter is fully tilted.

23. An unloader as set forth in claim 22 comprising retractable, centering tire stop means at the rear of said roller platform.

24. An unloader as set forth in claim 23 wherein said stop means comprises a pair of spaced-apart retractable elements adapted to receive and center the tire therebetween when in their unretracted position.

25. A tire curing press unloader comprising a horizontally movable unloader frame including a pair of spaced-apart vertical plates each having a vertical slot therein, platform support shaft means disposed in said slots for vertical and pivotal movement therein, means to elevate and pivot said platform support shaft means, and platform means mounted on said platform support shaft means for movement therewith.

26. An unloader as set forth in claim 25 wherein said platform means comprises a pair of forwardly extending, spaced-apart tire support arms mounted on said shaft means for movement therewith.

27. An unloader as set forth in claim 26 wherein the spacing between said tire support arms is adjustable.

28. An unloader as set forth in claim 27 wherein said shaft means has freely rotatable rollers mounted thereon and disposed in said slots for vertical movement therein.

29. An unloader as set forth in claim 28 wherein said means to pivot said platform comprises a pivot control member connected intermediate said plates to said shaft means for common pivotal movement therewith.

30. An unloader as set forth in claim 29 comprising an obstruction extending between and connected to said plates, and said pivot control member includes an arm adapted to engage said obstruction to require said shaft means to pivot.

31. An unloader as set forth in claim 24 wherein said spaced-apart vertical plates are secured to an inverted U-shape saddle and said saddle is adapted to be mounted on the curing press for horizontal movement.

32. An unloader for a dual cavity tire curing press comprising a horizontally movable unloader frame adapted to be mounted intermediate the mold cavities of said press, said unloader frame having vertical slot means, platform support shaft means disposed in said slot means for movement therein, said support shaft means having opposite ends extending laterally from said unloader frame, a pair of spaced-apart tire support arms mounted on said support shaft means at each said end, and means to move vertically and to pivot said support shaft means and thus said tire support arms.

33. An unloader as set forth in claim 32 comprising roller platform support means mounted on said unloader means, said roller platform support means having opposite ends extending laterally from said unloader frame, and roller platforms mounted on said roller support means rearwardly of each said support arms.

34. An unloader as set forth in claim 33 wherein said roller platform means comprise a shaft extending through a bore in said unloader frame, a first semicircular collar secured to said shaft, and a second semicircular collar secured to said unloader frame, the diametrical flat surfaces of said first and second collars being in juxtaposed relationship to limit rotation of said shaft relative to said unloader frame.

* * * * *